UNITED STATES PATENT OFFICE.

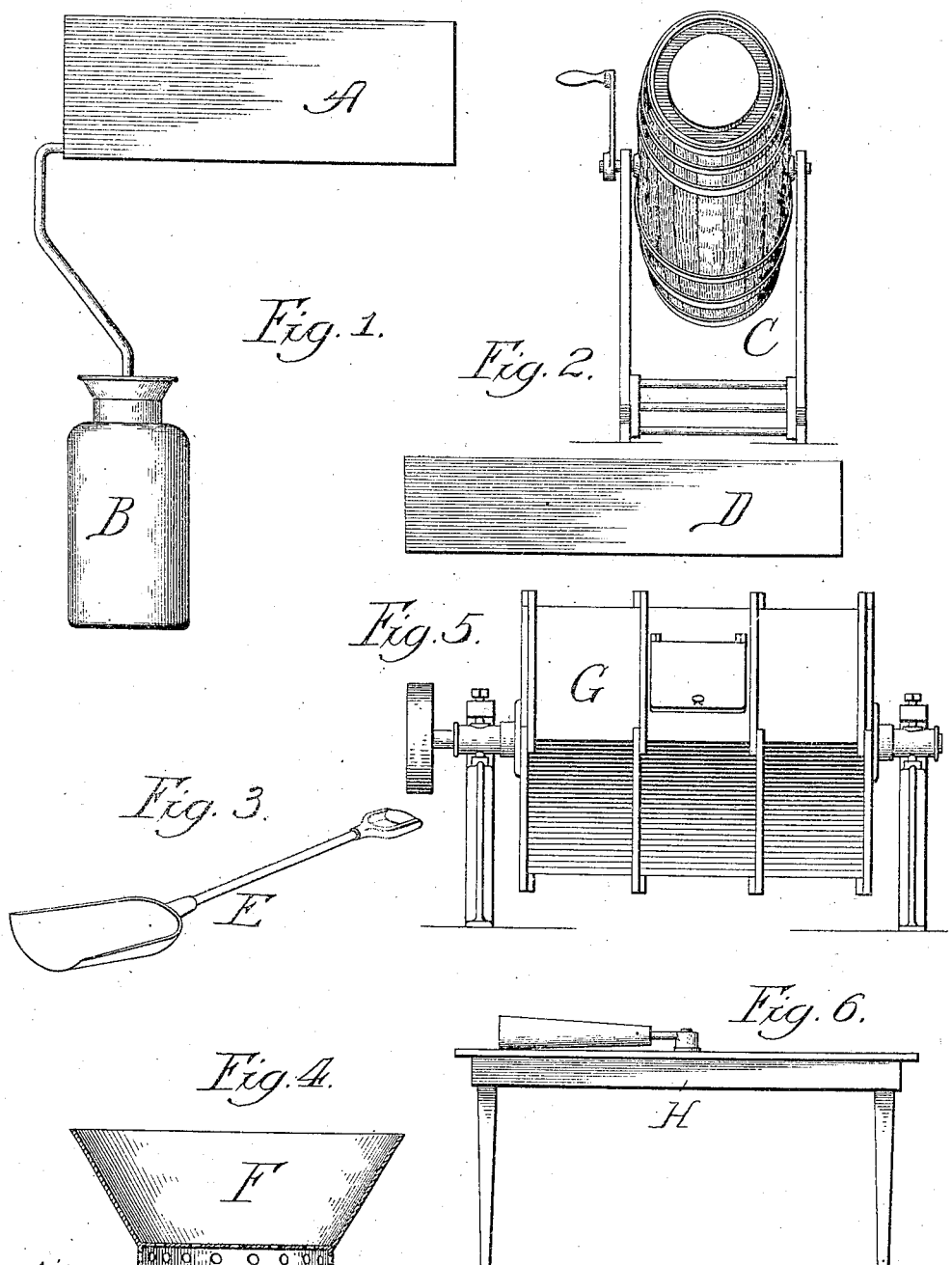

ROBERT ROOS, OF CHICAGO, ILLINOIS, ASSIGNOR TO AMERICAN FARM PRODUCTS COMPANY, OF JERSEY CITY, NEW JERSEY, A CORPORATION OF NEW JERSEY.

METHOD FOR THE MANUFACTURE OF PROCESS BUTTER.

No. 854,383.     Specification of Letters Patent.     Patented May 21, 1907.

Application filed June 30, 1906. Serial No. 324,287.

*To all whom it may concern:*

Be it known that I, ROBERT ROOS, a citizen of the United States, residing at Chicago, in the county of Cook and State of Illinois, have invented a new and useful Improvement in Method for the Manufacture of Process Butter, of which the following is a specification.

My invention relates to a certain new and useful method for the manufacture of process butter from butter oil and milk; and the object is to produce a process which is comparatively simple to practice, and which produces a better grade of product than has heretofore been secured.

To this end, my invention consists in certain steps of procedure which I shall hereafter set forth.

An apparatus suitable for the practice of my method is illustrated in the accompanying drawing, in which—

Figure 1 is a view of the portions of the apparatus in which the souring of the milk takes place; Fig. 2, a diagrammatic representation of the first churn and the crystallizing tank; Fig. 3 is a representation of the device by which the crystals are removed from the tank; Fig. 4 is a representation of one of the pans in which the crystals are cured; Fig. 5 is a diagrammatic representation of a second churn in which the crystals are agitated; and Fig. 6 is a diagrammatic representation of the butter-working device.

As the first step in my process, I take a quantity of skim-milk and permit it to stand in a tank, A, in a temperature of approximately 60° F. until it begins to sour. It is then placed, preferably in ordinary milk-cans, B, in a refrigerating room with a temperature of from 34° to 38° F., and kept at that temperature for approximately fifteen hours, or longer if required. I then add to the skim-milk a large, preferably, an equal, quantity of fresh full milk of such temperature as will bring the resulting mixture to about 60° F. I find, in practice, that the temperature of the fresh full milk should be about 80° F. to produce this result, when the proportions of full milk and skim-milk are equal. This mixture is then placed in an ordinary churn of any desired sort, represented by C in the drawing, and churned until the milk breaks. This will ordinarily take about a half hour.

When the milk breaks I add to it a clear, pure butter oil, preferably in the proportion of about three parts of milk to five parts of oil by weight, (though this proportion may be varied considerably) and churn for a few minutes (four minutes being ordinarily sufficient) for the purpose of securing a perfect emulsion of the milk and oil. In practice, I obtain the pure butter oil by melting and decanting butter, and then treating with an air blast, and finally washing it, but any process which will yield butter-oil of the required purity may be employed instead. The butter oil, when added to the churned milk, should be at a temperature of from 108° to 110° F.

After securing a perfect emulsion of the milk and oil, I pour the emulsion into tanks of ice-water D, whereby butter crystals are formed in a very light, flocculent, porous, yellow mass, all of the milk which was originally contained in the mass being incorporated within the body of the butter crystals. After a few moments, when the crystals have become thoroughly hardened by the cold water, I remove the flocculent mass from the ice-water by shovels E, drain it, and place it for curing in small pans, F, with perforated bottoms, each approximately twenty inches in diameter and eight inches deep, in which it is permitted to stand for a sufficient time, preferably about twenty-four hours, in a room having a temperature of approximately 60° F. During this curing period the butter takes up from the milk incorporated with it, the proper flavor, and to secure the best results, I find that the crystallized material in the pans should be turned over at least once during the twenty-four hours. This can readily be accomplished by placing an empty pan over a full pan and inverting the two, whereupon the pan emptied can be used to receive the mass from the next pan, and so on.

After the curing operation is completed, I place the mass of butter crystals in a churn G, adding to the mass of crystals a quantity of salt in the proportion of twenty-six pounds of salt, more or less, to about three hundred and fifty pounds of butter crystals, and churn the mixture for five or six minutes. During this operation the butter crystals are broken up and the liquid therein contained flows off. The salt to a large extent goes into solution in this liquid and is lost and the remainder thereof is intimately distributed through the butter so as to give the same a uniform and highly satisfactory flavor. After this second churning operation the churn is opened and the liquid flows off carrying with it the excessive proportion of salt which was added, the remainder being left behind thoroughly mixed with the butter. The butter which is left behind is placed upon an ordinary butter-worker, diagrammatically illustrated in the drawing by H, and worked in the ordinary way until the desired consistency is obtained.

I realize that considerable variations are possible in the operations above set forth, without departing from the spirit of my invention; and by stating fully the preferred procedure, I do not intend to limit myself thereto, except as set forth in the following claims.

What I regard as new, and desire to secure by Letters Patent, is—

1. The herein described process which consists in acidulating skim-milk, adding to it fresh full milk, churning the mixture until it breaks, adding butter oil, and emulsifying by agitation, crystallizing the emulsion by immersion in cold water, curing the crystallized mass in small quantities to which the air has access, and working the cured crystals to remove the excessive milk.

2. As a step in the process of forming butter, forming an emulsion, the constituents of which are butter oil, and partly churned milk, crystallizing the emulsion by immersion in cold water, and curing the crystal by exposing the crystals in small quantities to moderately warm air.

3. As a step in the formation of butter, the curing of butter-crystals by exposure in small lots to moderately warm air.

4. As a step in the formation of butter, the curing of butter-crystals by exposure in small lots to moderately warm air for a period of approximately twenty-four hours.

5. As a step in the formation of butter, the curing of butter-crystals by exposure in small lots to moderately warm air, and inverting the masses of crystals during the curing period.

6. As a step in the process of manufacturing butter, the addition to the cured crystals of an excessive quantity of salt, and working the crystals and salt to drive off the milk contained in the crystals, together with the excess of salt.

7. The herein described process which consists in acidulating skim-milk, adding full fresh milk in about equal quantity, churning the mixture until it breaks, adding butter oil and emulsifying the mixture, crystallizing the emulsion, and subsequently working the crystals.

8. The process of forming butter, which consists in churning milk until it breaks, adding thereto butter oil in the proportion of about five parts of oil to three parts of milk, emulsifying the mixture, crystallizing the emulsion, and subsequently working the crystals.

9. The process of manufacturing butter which consists in acidulating skim-milk, adding thereto an equal proportion of full fresh milk, churning the mixture until it breaks, adding thereto butter oil at a temperature of approximately 108 to 110° F. in the proportion of about five parts of oil to three of milk, emulsifying the mixture, crystallizing the emulsion in cold water, curing the crystals and working the cured crystals.

10. The process of manufacturing butter which consists in acidulating skim-milk, adding thereto an equal proportion of full fresh milk, churning the mixture until it breaks, adding thereto butter oil at a temperature of approximately 108 to 110° F. in the proportion of about five parts of oil to three of milk, emulsifying the mixture, crystallizing the emulsion in cold water, adding to the crystals an excessive proportion of salt and working the crystals to drive off the incorporated milk and excessive salt.

11. The process which consists in acidulating skim-milk adding thereto full fresh milk, bringing the mixture to the temperature of approximately 60° F., churning the mixture until it breaks, adding butter oil at a temperature of approximately 108 to 110° F., emulsifying by agitation, crystallizing the emulsion in cold water, curing the crystals by exposure in small quantities to air, at a temperature of about 60° F., for a considerable period, and working the cured crystalline mass.

12. As a step in the process of manufacturing butter, churning acidulated milk until it breaks, adding thereto butter oil in excess of the quantity of milk, emulsifying the mixture by agitation, and crystallizing the emulsion by chilling.

13. As a step in the process of manufacturing butter, acidulating skim-milk, adding thereto approximately an equal proportion of fresh full milk, churning the mixture until it breaks, adding thereto butter oil, emulsifying the mixture and crystallizing the emulsion.

14. The process of manufacturing butter, consisting in churning acidulated milk until it breaks, adding thereto butter oil, emulsifying the mixture, crystallizing the emulsion, curing the crystals in small quantities in contact with warm air, and working the crystals.

15. The process of manufacturing butter which consists in churning acidulated milk until it breaks, adding thereto butter oil, emulsifying the mixture, crystallizing the emulsion, adding thereto an excess of salt, and working the crystals to drive off the excess of milk and salt.

ROBERT ROOS.

Witnesses:
 RUSSELL WILES,
 J. H. LANDES.